(12) United States Patent
Green et al.

(10) Patent No.: US 9,010,167 B2
(45) Date of Patent: Apr. 21, 2015

(54) SHAPING APPARATUS AND METHOD OF SHAPING A WORKPIECE

(71) Applicant: Rolls-Royce PLC, London (GB)

(72) Inventors: Richard Green, Bristol (GB); Michael John Annear, Bristol (GB)

(73) Assignee: Rolls-Royce PLC, London (GB)

(*) Notice: Subject to any disclaimer, the term of this patent is extended or adjusted under 35 U.S.C. 154(b) by 257 days.

(21) Appl. No.: 13/677,803

(22) Filed: Nov. 15, 2012

(65) Prior Publication Data
US 2013/0156557 A1 Jun. 20, 2013

(30) Foreign Application Priority Data

Dec. 15, 2011 (GB) .................................. 1121527.4

(51) Int. Cl.
| | |
|---|---|
| *B21D 7/16* | (2006.01) |
| *B21D 22/00* | (2006.01) |
| *B21D 37/01* | (2006.01) |
| *B21D 37/16* | (2006.01) |
| *B21D 53/84* | (2006.01) |
| *F02C 7/00* | (2006.01) |

(52) U.S. Cl.
CPC ......... *B21D 7/162* (2013.01); *Y10T 428/12299* (2015.01); *B21D 22/00* (2013.01); *B21D 37/01* (2013.01); *B21D 37/16* (2013.01); *B21D 53/84* (2013.01); *F02C 7/00* (2013.01)

(58) Field of Classification Search
CPC .......... B21B 5/00; B24B 39/04; B21D 11/02; B21D 25/02; B21D 37/16
USPC ............. 72/342.7, 342.8, 110, 111, 296, 297, 72/465.1; 148/646, 669, 670
See application file for complete search history.

(56) References Cited

U.S. PATENT DOCUMENTS

| | | | | |
|---|---|---|---|---|
| 2,952,767 A | * | 9/1960 | Maloney | 72/297 |
| 3,383,900 A | * | 5/1968 | Van Hartesveldt | 72/342.7 |
| 4,011,429 A | * | 3/1977 | Morris et al. | 72/342.8 |
| 4,242,899 A | * | 1/1981 | Raymond | 72/342.7 |
| 4,989,433 A | * | 2/1991 | Harmon et al. | 72/342.7 |

(Continued)

FOREIGN PATENT DOCUMENTS

| | | |
|---|---|---|
| DE | 102009018798 A1 | 10/2009 |
| JP | A-10-328749 | 12/1998 |
| WO | WO 2007/022303 A2 | 2/2007 |

OTHER PUBLICATIONS

Jan. 30, 2012 Search Report issued in British Application No. 1121527.4.

(Continued)

*Primary Examiner* — David B Jones
(74) *Attorney, Agent, or Firm* — Oliff PLC

(57) ABSTRACT

A shaping apparatus for shaping a workpiece. The apparatus comprises first and second pairs of shaping members and a spacer located between the first and second pairs of shaping members. The first pair of shaping members comprises a material having a first linear coefficient of thermal expansion, and the second pair of shaping members comprises a material having a third linear coefficient of thermal expansion. The first linear coefficient of thermal expansion is higher than the second linear coefficient of thermal expansion such that on heating of the apparatus, thermal expansion of the shaping members causes the first pair of shaping members to expand outwardly, and the second pair of shaping members to expand inwardly.

13 Claims, 4 Drawing Sheets

(56) References Cited

U.S. PATENT DOCUMENTS

| | | | |
|---|---|---|---|
| 5,407,494 A * | 4/1995 | Post | 148/521 |
| 7,168,279 B2 * | 1/2007 | Nakajima et al. | 72/111 |
| 7,866,041 B2 * | 1/2011 | Green et al. | 148/646 |
| 8,210,020 B2 * | 7/2012 | Schier et al. | 72/465.1 |
| 8,549,889 B2 * | 10/2013 | Morales | 72/342.8 |
| 2003/0204944 A1 | 11/2003 | Norek | |
| 2006/0230807 A1 | 10/2006 | Shultz et al. | |
| 2008/0037142 A1 | 2/2008 | Chang | |

OTHER PUBLICATIONS

Jan. 29, 2013 European Search Report issued in European Patent Application No. 12192698.

* cited by examiner

SHAPING APPARATUS AND METHOD OF SHAPING A WORKPIECE

The present invention relates to a shaping apparatus.

Items such as hollow, partially formed workpieces for gas turbine engines may require a shaping step to form a final required shape of the component.

One current method of shaping a partially formed hollow workpiece is to place the workpiece around a work tool. The work tool is heated such that it expands, thereby engaging with the workpiece, and stretching the workpiece outwardly to obtain the desired shape.

In some circumstances it may be desirable to prevent some parts of the workpiece from being stretched outwardly while other parts are stretched outwardly by expansion of the work tool. Conventionally, the parts that need to remain in place are held using clamps. However, such clamps result in "pinching" of the walls of the workpiece, which results in a workpiece which does not have the desired final shape to within required tolerances.

The present invention provides a shaping apparatus and a method of shaping a workpiece which overcomes some or all of these problems.

In accordance with a first aspect of the invention there is provided a shaping apparatus, the apparatus comprising;

a first pair of shaping members comprising a material having a first linear coefficient of thermal expansion, and a spacer located between the first pair of shaping members, the spacer comprising a material having a second linear coefficient of thermal expansion;

a second pair of shaping members comprising a material having a third linear coefficient of thermal expansion;

the spacer being located between the second pair of shaping members;

wherein the first linear coefficient of thermal expansion is higher than the second linear coefficient of thermal expansion such that on heating of the apparatus, thermal expansion of the shaping members causes the first pair of shaping members to expand outwardly, and the second pair of shaping members to expand inwardly.

Such an arrangement provides a shaping apparatus which can shape the internal and external surfaces of a hollow workpiece without pinching the walls. The apparatus is therefore able to shape the component to within closer tolerances in comparison to prior apparatus, while maintaining the required wall thickness.

In accordance with a second aspect of the invention there is provided a method of shaping a workpiece using the shaping apparatus of the first aspect, the method comprising;

placing at least part of a workpiece around the first pair of shaping members and between the second pair of shaping members heating the apparatus and the workpiece such that thermal expansion of the apparatus causes the first pair of shaping members to expand outwardly, and the second pair of shaping members to expand inwardly.

In accordance with a third aspect of the present invention there is provided a workpiece shaped using the method in accordance with the second aspect of the invention.

The workpiece may comprise a duct for a gas turbine engine.

In accordance with a fourth aspect of the present invention there is provided a gas turbine engine comprising a shaped workpiece in accordance with the second aspect of the present invention.

Further features of the invention are set out in the dependent claims.

For a better understanding of the present invention, and to show more clearly how it may be carried into effect, reference will now be made, by way of example, to the accompanying drawings, in which.

Figure 4:
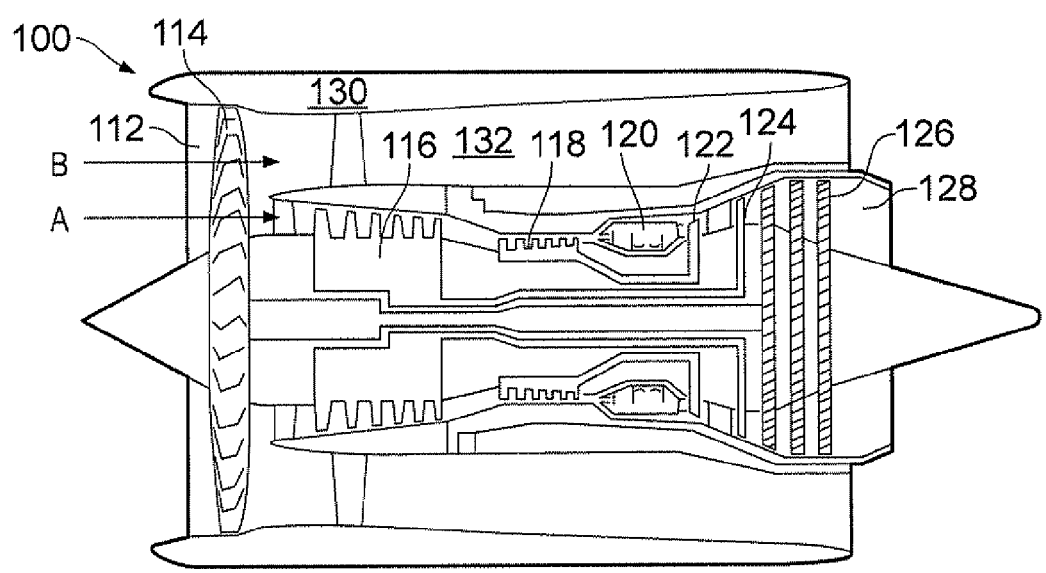
FIG. 4 is a diagrammatic cross sectional view of a gas turbine engine incorporating a workpiece in accordance with the present invention.

FIG. 4 shows a gas turbine engine 100 comprising an air intake 112 and a propulsive fan 114 that generates two airflows A and B. The gas turbine engine 100 comprises, in axial flow A, an intermediate pressure compressor 116, a high pressure compressor 118, a combustor 120, a high pressure turbine 122, an intermediate pressure turbine 124, a low pressure turbine 126 and an exhaust nozzle 128. A nacelle 130 surrounds the gas turbine engine 110 and defines, in axial flow B, a bypass duct 132. The nozzle 128 comprises a duct 10 which directs hot exhaust gas to provide thrust.

Figure 1:
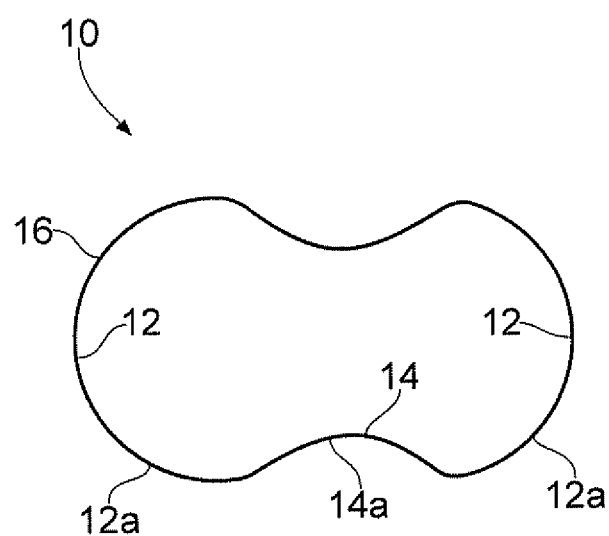
FIG. 1 is a cross sectional view through an end of a workpiece having a desired final shape.

FIG. 1 shows a cross section through an end of a hollow workpiece in the form of the duct 10 for the gas turbine engine 110 having a desired final shape. The duct 10 could initially be formed using a hot forming technique for example, which may produce a duct 10 having a shape which is similar to the desired final shape, but does not conform to the desired shape to within required tolerances. A further shaping operation is therefore required in order to produce a duct 10 having a shape which more closely corresponds to the desired shape.

As shown in FIG. 1, the duct 10 is generally hollow, having a continuous duct wall 16 defining a desired internal profile. The desired internal profile includes generally concave curved end parts 12, and a waisted convex section 14 between the end parts 12. In order to conform to the desired profile, the thickness of the duct wall 16 should be substantially constant around the perimeter of the duct 10. The duct 10 also comprises an external profile which mirrors the internal profile. As such, the external profile comprises generally convex end parts 12a, and a waisted concave section 14a between the end parts 12a.

Figure 2:
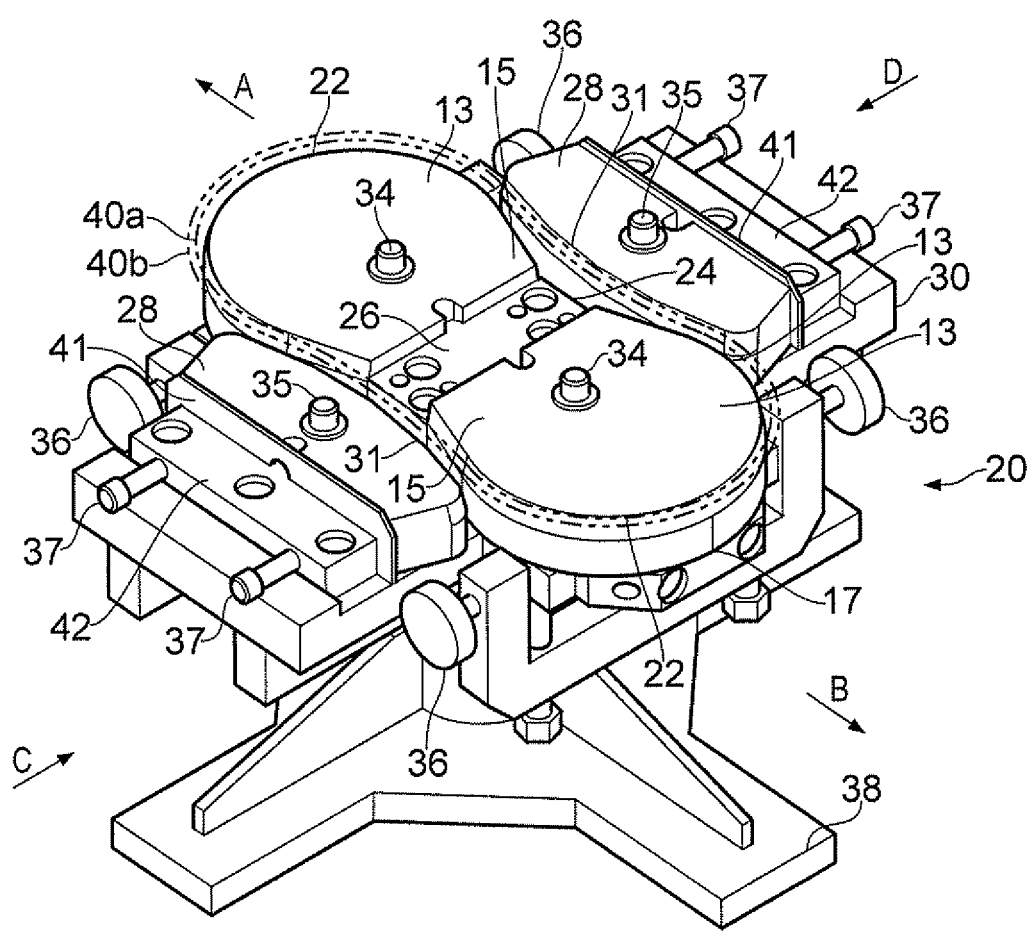
FIG. 2 is a perspective view of a shaping apparatus in accordance with the present invention.

FIG. 2 shows a shaping apparatus 20 in accordance with the present disclosure for shaping the duct 10 shown in FIG. 1. The apparatus 20 comprises a first pair of shaping members 22 which define a gap 24 therebetween. The shaping members 22 are spaced from one another by a spacer 26.

Each of the first pair of shaping members 22 are partly located in use between a second pair of shaping members 28, and the second pair of shaping members 28 are located such that clamping surfaces 31 of the second pair of shaping members are located adjacent the spacer 26.

Each of the first pair of shaping members 22 corresponds in shape to the desired inner profile of the ends 12 of the duct 10. In the embodiment shown, the shaping members 22 include convexly curved outer end parts 13, and wasted concavely curved inner end parts 15. The shaping members 22 are generally planar, and have a thickness 17 corresponding to the depth of the end part of the duct 10 which requires shaping.

Each of the second pair of shaping members 28 comprises a generally convex clamping surface 31 which corresponds in shape to the desired outer profile of the convex section 14 of the duet 10.

Each of the shaping members of the first and second pairs 22, 28 and the spacer 26 are mounted to a mounting arrangement in the form of a base plate 30 by a plurality of fasteners.

The fasteners include bolts 34 and 35. Bolts 34 comprise shoulders which retain the respective first shaping members 22 relative to the spacer 26, but allow the respective shaping members 22 to slide in directions A and B to some extent. Pins 36 are provided, which, in use, hold the first shaping members at a required height relative to the second shaping members 28. Similarly, bolts 35 comprise shoulders which retain the respective second shaping members 28, and pins 37 are provided which hold the second shaping members 28 at a required height relative to the first shaping members 22. Each of the second pair of shaping members 28 is held in place against a shim plate 41 by the bolts 35, and the shim plates 41 are in turn held against respective brackets 42 of the mounting plate 30 by the bolts 35 and pins 37. The mounting arrangement is in turn mounted on a support 38.

The shaping members 22, 28 are formed of a material having a first thermal coefficient of expansion, and the base plate 30 and the spacer 26 are formed of a material having a second thermal coefficient of expansion. In this embodiment, the material having the first thermal coefficient of expansion comprises Cronite™, and the material having the second thermal coefficient of expansion comprises Kovar™. Other suitable materials could be used however, provided the thermal coefficient of expansion of the material of the shaping members 22, 28 is greater than the thermal coefficient of expansion of the material of the spacer 26, Cronite typically comprises around 0.4% carbon, 25% chromium, 32.8% iron, 1% manganese, 2% niobium, 37% nickel and 1.8% silicon (by weight). The linear coefficient of thermal expansion of Cronite is around $1.7 \times 10^{-5}/°$ C. More generally, materials having a linear coefficient of thermal expansion of between $1 \times 10^{-5}/°$ C. and $2 \times 10^{-5}/°$ C. have been found to be effective.

Kovar is a nickel-cobalt ferrous alloy designed to be compatible with the thermal expansion characteristic of sealing to borosilicate glass. Kovar typically comprises around 29% nickel, 17% cobalt, 0.2% silicon, 0.3% manganese, and 53.5% iron (by weight). The linear coefficient of thermal expansion of Kovar is around $7 \times 10^{-6}/°$ C. More generally, materials having a linear coefficient of thermal expansion of between $5 \times 10^{-6}/°$ C. and $10 \times 10^{-6}/°$ C. have been found to be effective, though materials having lower linear coefficients of thermal expansion may also be effective. Other combinations of materials could be provided for the shaping members 22, 28 and spacer 26, provided that the linear coefficient of expansion of the material of the shaping members 22, 28 is greater than the linear coefficient of expansion of the material of the spacer 26.

A duct 10 is shaped using the apparatus 20 of the present disclosure by the following steps.

The assembly is assembled in a room temperature and pressure environment, at approximately 20° C., and 1 atmosphere pressure. The shaping members 22 are first installed on the mounting arrangement using bolts 34 and positioned using pins 36. The end part of the duct 10 as shown in FIG. 1 is then placed around the first pair of shaping members 22, as shown by the dotted lines 40a, 40b in FIG. 2, which respectively represent the initial internal and external profiles respectively of the duct 10 before the shaping process. The second pair of shaping members 28 are each then installed in position. The shim plates 41 are then installed between the respective brackets 42, and second shaping members 28. The dimensions of the shim plates (in particular the thickness) are chosen to correctly position the duct 10 in relation to the spacer members 22, 28. The pins 36, 37 are then removed prior to heat treatment, in order to prevent the pins 36, 37 from being welded to the duct 10 or apparatus 20.

The apparatus 20 and duct 10 are then placed in a furnace (not shown), where the temperature is raised to the stress relieving temperature of the material of the duct 10 for a period of time. Where the duct 10 comprises titanium, the temperature of the furnace is raised to around 650° C. for approximately 10 to 30 minutes, until the duct reaches the stress relieving temperature of the material. Temperature probes may be used to determine when the duct has reached the required temperature.

During the heating step, the apparatus 20 and duct 10 both expand due to the increase in temperature. However, the shaping members 22, 28 will expand to a different extent relative to the spacer 26, due to their different coefficients of thermal expansion. In particular, the shaping members 22, 28 will expand to a greater extent than the spacer 26 and the brackets 42. As a result, each of the first pair of shaping members 22 will expand outwardly in a respective direction A, B as shown in FIG. 2 away from the spacer 26. Inward expansion of the first pair of shaping members 22 will be substantially prevented by the spacer 26, which will expand at a different, lower rate to the shaping members 22, 28. Each of the second pair of shaping members 28 will expand inwardly in a respective direction C, D, and will be prevented from expanding outwardly by the brackets 42, which will also expand at a lower rate compared to the spacer members 22, 28.

Figure 3:
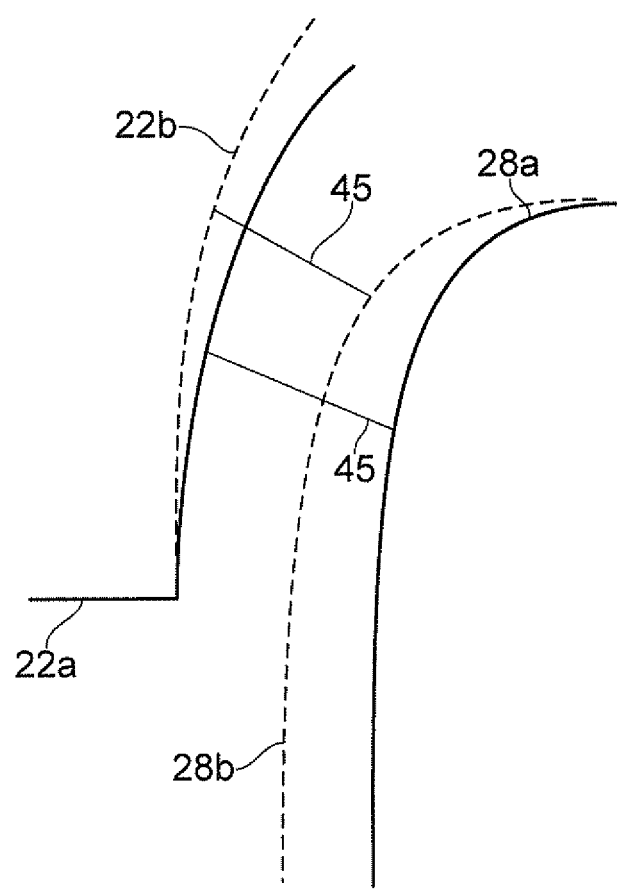
FIG. 3 is a diagrammatic view of a part of the shaping apparatus of FIG. 2 before and during heating.

FIG. 3 shows a close up view of part of one of the first pair of shaping members 22 and part of one of the second pair of shaping members 28 when at room temperature (shown as the solid lines 22a, 28a) and when heated in the furnace (shown as the dotted lines 22b, 28b). As shown in FIG. 3, as the apparatus is heated, the convex end parts 13 of the first pair of shaping members 22 will move outwardly in the directions A and B, thereby accommodating the inward movement of the second pair of shaping members 28 and thus maintaining the clearance 45 therebetween. As a result, the apparatus 20 will shape the duct 10 to a desired shape without clamping or pinching the wall 16 of the duct, thereby ensuring that the final duct 10 has the desired shape to within required tolerances.

While the invention has been described in conjunction with the example described above, many equivalent modifications and variations will be apparent to those skilled in the art when given this disclosure. Accordingly, the examples of the invention set forth above are considered to be illustrative and not limiting. Various changes to the described embodiment may be made without departing from the spirit and scope of the invention.

For example, the shaping members and spacer could be formed of different materials, provided the material of the spacer has a lower coefficient of thermal expansion than the shaping members. Different shape spacer members could be employed to shape workpieces having a different required shape. The apparatus could be configured to shape different materials, such as aluminium.

The invention claimed is:

1. A shaping apparatus for shaping a workpiece, the apparatus comprising:
   a first pair of shaping members comprising a material having a first linear coefficient of thermal expansion, and a spacer located between the first pair of shaping members, the spacer comprising a material having a second linear coefficient of thermal expansion; and
   a second pair of shaping members comprising a material having a third linear coefficient of thermal expansion, wherein the spacer is located between the second pair of shaping members; and the first and third linear coefficients of thermal expansion are higher than the second linear coefficient of thermal expansion such that on heating of the apparatus, thermal expansion of the shaping members causes the first pair of shaping members to expand outwardly, and the second pair of shaping members to expand inwardly.

2. The shaping apparatus according to claim 1, wherein the first linear coefficient of thermal expansion is substantially equal to the third linear coefficient of thermal expansion.

3. The shaping apparatus according to claim 1, wherein the ratio of the first coefficient of thermal expansion to the second coefficient of thermal expansion is at least 2.

4. The shaping apparatus according to claim 1, wherein the first linear coefficient of expansion is at least 1×10-5/° C. but no greater than 2×10-51° C.

5. The shaping apparatus according to claim 1, wherein the first linear coefficient of expansion is approximately 1.7×10-5/° C.

6. The shaping apparatus according to claim 1, wherein the second linear coefficient of expansion is at least 5×10-61° C. but no greater than 10×10-6/° C.

7. The shaping apparatus according to claim 1, wherein the second linear coefficient of expansion is approximately 7×10-61° C.

8. The shaping apparatus according to claim 1, wherein the material having the second linear coefficient of thermal expansion comprises approximately 29% wt nickel, 17% wt cobalt, 0.2% wt silicon, 0.3% wt manganese, and 53.5% wt iron.

9. The shaping apparatus according to claim 1, wherein the material having the first or third linear coefficients of thermal expansion comprises approximately 0.4% carbon, 25% chromium, 32.8% wt iron, 1% wt manganese, 2% wt niobium, 37% wt nickel and 1.8% wt silicon.

10. The shaping apparatus according to claim 1, further comprising a base member to which at least one of the shaping members and spacer can be mounted.

11. The shaping apparatus according to claim 10, wherein the base member comprises the material having the second linear coefficient of thermal expansion.

12. A method of shaping a workpiece using the shaping apparatus of claim 1, the method comprising:

placing at least part of a workpiece around the first pair of shaping members and between the second pair of shaping members; and heating the apparatus and the workpiece such that thermal expansion of the shaping members causes the first pair of shaping members to expand outwardly, and the second pair of shaping members to expand inwardly.

13. The method of shaping a workpiece according to claim 12, wherein the shaping apparatus and workpiece are heated to a stress relieving temperature of the workpiece.

\* \* \* \* \*